United States Patent [19]

Tomotsu et al.

[11] Patent Number: 5,422,407

[45] Date of Patent: * Jun. 6, 1995

[54] PROCESS FOR PRODUCING STYRENE-BASED POLYMERS AND CATALYST FOR USE THEREIN

[75] Inventors: Norio Tomotsu; Hiroshi Maezawa, both of Ichihara, Japan

[73] Assignee: Idemitsu Kosan Co., Ltd., Tokyo, Japan

[*] Notice: The portion of the term of this patent subsequent to Jan. 4, 2011 has been disclaimed.

[21] Appl. No.: 92,791

[22] Filed: Jul. 19, 1993

Related U.S. Application Data

[60] Division of Ser. No. 944,727, Sep. 15, 1992, Pat. No. 5,276,117, which is a continuation of Ser. No. 697,729, May 3, 1991, abandoned, which is a continuation of Ser. No. 313,749, Feb. 22, 1989, abandoned.

[30] Foreign Application Priority Data

Mar. 24, 1988 [JP] Japan .................. 63-068319

[51] Int. Cl.$^6$ .................. C08F 4/651; C08F 12/08
[52] U.S. Cl. .................. 526/142
[58] Field of Search .................. 526/142

[56] References Cited

U.S. PATENT DOCUMENTS

| | | | |
|---|---|---|---|
| 3,242,099 | 3/1966 | Manyik et al. | 526/153 |
| 3,883,492 | 5/1975 | Delbouille et al. | 526/124 |
| 4,622,309 | 11/1986 | Coleman et al. | 526/142 |
| 4,680,353 | 7/1987 | Ishihara et al. | 526/160 |
| 5,142,005 | 8/1992 | Albizzati et al. | 526/165 |
| 5,276,117 | 1/1994 | Tomotsu et al. | 526/142 |

*Primary Examiner*—Edward J. Smith
*Attorney, Agent, or Firm*—Oblon, Spivak, McClelland, Maier & Neustadt

[57] ABSTRACT

A catalyst for producing styrene-based polymers, containing (A) a titanium compound, (B) a contact product of an organoaluminum compound and water, and (C) an organic polyhydroxy compound, or (A) a titanium compound and (B) a contact product of an organoaluminum compound, water and a organic polyhydroxy compound, and a process for producing styrene-based polymers by the use of the above catalyst.

6 Claims, No Drawings

PROCESS FOR PRODUCING STYRENE-BASED POLYMERS AND CATALYST FOR USE THEREIN

This is a division of application Ser. No. 07/944,727, filed on Sep. 15, 1992, now U.S. Pat. No. 5,276,117, which is a continuation of Ser. No. 07/697,729, filed May 3, 1991, now abandoned, which is a continuation of Ser. No. 07/313,749, filed Feb. 22, 1989, now abandoned.

BACKGROUND OF THE INVENTION

1. Field of the Invention

The present invention relates to a process for producing styrene-based polymers and a catalyst for use therein. More particularly, it is concerned with a process for efficiently producing styrene-based polymers having a stereostructure which has mainly syndiotactic configuration and a catalyst for use in said process.

2. Description of the Related Art

It is known as described in, for example, Japanese Patent Application Laid-Open No. 187708/1987 that a two component catalyst comprising (A) a titanium compound and (B) a contact product of an organoaluminum compound and a condensing agent is used in polymerization of styrene or styrene derivatives.

Such two component catalysts, however, have disadvantages of being expensive and failing to exhibit sufficiently high activity.

For this reason, addition of an organoaluminum compound as the third component to the two component catalyst for the purpose of increasing catalyst activity has been proposed. However, no compounds capable of substantially increasing catalyst activity as the third component have been known.

SUMMARY OF THE INVENTION

An object of the present invention is to provide a process for efficiently producing styrene-based polymers.

Another object of the present invention is to provide a process for producing styrene-based polymers having mainly a syndiotactic configuration.

Another object of the present invention is to provide a catalyst having increased activity, for use in production of styrene-based polymers.

It has been found that the objects can be attained by using a catalyst prepared by compounding an organic polyhydroxy compound to the aforementioned two component catalyst.

The present invention relates to a catalyst for producing styrene-based polymers, containing (A) a titanium compound, (B) a contact product of an organoaluminum compound and water, and (C) an organic polyhydroxy compound.

The present invention further relates to a process for producing styrene-based polymers which comprises polymerizing the corresponding monomers in the presence of the above catalyst.

DESCRIPTION OF PREFERRED EMBODIMENTS

In the catalyst of the present invention, the organic polyhydroxy compound as the component (C) may be added at the step of preparing the contact product of the organoaluminum compound and water.

The catalyst of the present invention contains, as described above, the components (A), (B) and (C) as main components.

Various titaniumm compounds can be used as the component (A). For example, at least one compound selected from the group consisting of titanium compounds and titanium chelate compounds represented by the general formula:

 (I)

or

 (II)

(wherein $R^1$, $R^2$, $R^3$ and $R^4$ are independently a hydrogen atom, an alkyl group having 1 to 20 carbon atoms, an alkoxy group having 1 to 20 carbon atoms, an aryl group having 6 to 20 carbon atoms, an alkylaryl group having 6 to 20 carbon atoms, an arylalkyl group having 6 to 20 carbon atoms, an acyloxy group having 1 to 20 carbon atoms, a cyclopentadienyl group, a substituted cyclopentadienyl group, an indenyl group or a halogen atom, a, b and c are independently an integer of 0 to 4, and d and e are independently an integer of 0 to 3) can be used.

$R^1$, $R^2$, $R^3$ and $R^4$ in the general formula (I) or (II) are independently a hydrogen atom, an alkyl group having 1 to 20 carbon atoms (e.g., a methyl group, an ethyl group, a propyl group, a butyl group, an amyl group, an isoamyl group, an isobutyl group, an octyl group, and a 2-ethylhexyl group), an alkoxy group having 1 to 20 carbon atoms (e.g., a methoxy group, an ethoxy group, a propoxy group, a butoxy group, an amyloxy group, a hexyloxy group, a phenoxy group, and a 2-ethylhexyloxy group), an ary group, an alkylaryl group and an arylalkyl group each having 6 to 20 carbon atoms (e.g., a phenyl group, a tolyl group, a xylyl group, and a benzyl group), an acyloxy group having 1 to 20 carbon atoms (e.g., a heptadecylcarbonyloxy group), a cyclopentadienyl group, a substituted cyclopentadienyl group (e.g., a methylcyclopentadienyl group, a 1,2-dimethylcyclopentadienyl group, and a pentamethylcyclopentadienyl group), an indenyl group or a halogen atom (chlorine, bromine, iodine and fluorine). $R^1$, $R^2$, $R^3$ and $R^4$ may be the same or different. a, b and c are independently an integer of 0 to 4. d and e are independently an integer of 0 to 3.

Specific examples of tetravalent titanium compounds and titanium chelate compounds represented by the general formula (I) are methyltitanium trichloride, titanium tetramethoxide, titanium tetraethoxide, titanium monoisopropoxytrichloride, titanium diisopropoxydichloride, titanium triisopropoxymonochloride, tetra(2-ethylhexyloxy)titanium, cyclopentadienyltitanium trichloride, biscyclopentadienyltitanium dichloride, cyclopentadienyltitanium trimethoxide, cyclopentadienyltrimethyltitanium, pentamethylcyclopentadienyltitanium trimethoxide, pentamethylcyclopentadienyltrimethyltitanium, titanium tetrachloride, titanium tetrabromide, bis(2,4-pentanedionate)titanium oxide, bis(2,4-pentanedionate)titanium dichloride, and bis(2,4-pentanedionate)titanium dibutoxide.

In addition, condensed titanium compounds represented by the general formula:

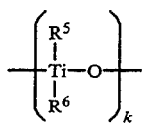

(wherein $R^5$ and $R^6$ are independently a halogen atom, an alkoxy group or an acyloxy group, and k is 2 to 20) can be used as titanium compounds of the component (A).

The above titanium compounds can be used in the form of complexes with esters, ethers, and the like.

Specific examples of trivalent titanium compounds represented by the general formula (II) are titanium trihalide, e.g., titanium trichloride, and cyclopentadienyltitanium compounds, e.g., cyclopentadienyltitanium dichloride. In addition, those resulting from reduction of tetravalent titanium compounds can be used. These trivalent titanium compounds can be used in the form of complexes with esters, ethers and the like.

The component (B) to be used as one of the main components of the catalyst of the present invention is obtained by subjecting a contact product of an organoaluminum compound and water to heat treatment. As the above organoaluminum compound, organoaluminum compounds represented by the general formula:

(wherein $R^7$ is an alkyl group having 1 to 8 carbon atoms) are usually used. Specific examples of the organoaluminum compounds are trimethylaluminum, triethylaluminum, and triisobutylaluminum. Of these compounds, trimethylaluminum is most preferred.

As the water to be contacted with the above organoaluminum compounds, the normal water or ice, or various water-containing compounds, e.g., water contained in a solvent, water absorbed in an inorganic or organic compound, and water of crystallization contained in metal salts (e.g., $CuSO_4\cdot 5H_2O$) can be used. The above water may contain ammonia, amine such as ethylamine, sulfur compounds such as hydrogen sulfide, phosphorous compounds such as phosphorous ester, and so on in the proportion of less than 20%.

The contact product of the organoaluminum compound and water includes various products, although they are not always identified. For example, when the organoaluminum compound is trimethylaluminum, the contact product contains chain-like methylaluminoxane represented by the general formula:

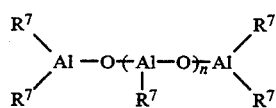

(wherein n indicates a degree of polymerization) and cyclic methylaluminoxane having a repeating unit represented by the general formula:

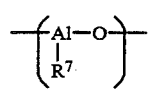

In general, the contact product of the organoaluminum compound (e.g., trialkylaluminum) and water contains various compounds, the type of which varies depending on contacting conditions. For example, when the organoaluminum compound is trialkylaluminum, the contact product is a mixture of the aforementioned chain-like alkylaluminoxane (e.g., chain-like methylaluminoxane) and cyclic alkylaluminoxane (e.g., cyclic methylaluminoxane), unreacted trialkylaluminum, and other condensates, or a molecule resulting from association in a complicated manner of the above mixture.

The reaction of the organoaluminum compound and water is not critical; they can be reacted according to known techniques such as (1) a method in which the organoaluminum compound is dissolved in an organic solvent, and the resulting solution is contacted with water, (2) a method in which the organoaluminum compound is previously added at the time of polymerization and, thereafter, water is added, and (3) a method in which the organoaluminum compound is reacted with water of crystallization contained in, for example, metal salt, or water absorbed in an inorganic or organic compound.

The reaction of the organoaluminum compound and water is preferably carried out in a solvent, although it can be carried out in the absence of a solvent. Suitable examples of the solvent are aliphatic hydrocarbons such as hexane, heptane, and decane, and aromatic hydrocarbons such as benzene, toluene, and xylene.

In the reaction of the organoaluminum compound and water, if the reaction temperature is set at a somewhat high level and the reaction time is made longer, the molecular weight is increased and a contact product having a molecular weight falling within the desired range can be obtained.

Organic polyhydroxy compounds which can be used as the component (C), another main component of the catalyst of the present invention include aliphatic polyhydroxy compounds, alicyclic polyhydric alcohols, and aromatic polyhydroxy alcohols. More specifically, as the aliphatic polyhydric alcohol, 2 to 20 valent alcohols having 1 to 20 carbon atoms, such as ethylene glycol, propylene glycol, 1,4-butanediol, 1,2-pentanediol, hexanediol, pinacol, glycerine, diethylene glycol, triethylene glycol, and dipropylene glycol can be used. As the alicyclic polyvalent alcohol, 2 to 10 valent alicyclic alcohols having 4 to 30 carbon atoms, such as 1,4-cyclohexane diol, 1,3-cyclopentane diol, sorbitol, and mannitol can be used. As the aromatic polyvalent alcohol, 2 to 10 valent aromatic alcohols having 6 to 30 carbon atoms, such as hydroquinone, catechol, and pyrogallol can be used.

The catalyst of the present invention contains the above components (A), (B) and (C) as main components. Other catalyst components, such as other organometallic compounds can be added, if necessary.

The ratio of component (A), component (B) and component (C) in the catalyst varies depending on various conditions and cannot be determined unconditionally. Usually, the molar ratio of aluminum in the component (B) to titanium in the component (A) i.e., aluminum/titanium is 1:1 to $1\times 10^6:1$ and preferably 10:1 to $1\times 10^4:1$, and the molar ratio of aluminum in the component (B) to hydroxy group in the component (C), i.e., aluminum/hydroxy group is 100:90 to 100:0.01 and preferably 100:50 to 100:1. If the molar ratio of aluminum to hydroxy group is more than 100:90, the resulting catalyst is insoluble in a hydrocarbon solvent and sometimes exhibits insufficiently high activity. On the other hand, if it is too small, the effect of addition of the polyhydroxy compound cannot be obtained.

In use of the catalyst of the present invention, the components (A), (B) and (C) may be mixed succesively. Preferably, after mixing of the components (B) and (C), the component (A) is added.

In preparing the contact product of the organoaluminum compound and water as the component (B), the component (C) may be added at the same time and the contact reaction may be carried out in the presence of the component (C). In this case, the catalyst of the present invention contains (A) a titanium compound and (B') a contact product of an organoaluminum compound, water and an organic polyhydroxy compound.

The catalyst of the present invention containing the components (A), (B) and (C), or the components (A) and (B') exhibits high activity in production of styrene-based polymers having mainly a syndiotactic configuration.

Thus the present invention further provides a process for producing styrene-based polymers by the use of the above catalyst.

In accordance with the process of the present invention, styrene-based monomers such as styrene and styrene derivatives (e.g., alkylstyrene, alkoxystyrene, halogenated styrene, and vinylbenzoic acid ester) are polymerized or copolymerized in the presence of the catalyst containing the components (A), (B) and (C), or the components (A) and (B'). This polymerization may be bulk polymerization, or may be carried out in a solvent of aliphatic hydrocarbon such as pentane, hexane and heptane, alicyclic hydrocarbon such as cyclohexane, or aromatic hydrocarbon such as benzene, toluene and xylene.

The polymerization temperature is usually $-30°$ C. to $+120°$ C. and preferably $-10°$ C. to $+100°$ C., although the present invention is not limited thereto.

In order to control the molecular weight of the styrene-based polymer, it is effective to carry out the polymerization in the presence of a chain transfer agent, e.g., hydrogen or an organoaluminum compound.

Styrene-based polymers produced by the process of the present invention have mainly a syndiotactic configuration. The styrene-based polymers having mainly a syndiotactic configuration refer to styrene-based polymers having a stereostructure that is mainly syndiotactic, i.e., a stereostructure in which phenyl groups or substituted phenyl groups as side chains are located alternately at opposite positions relative to the main chain composed of carbon-carbon bonds. The tacticity is quantitatively determined by the nuclear magnetic resonance method using a carbon isotope ($^{13}$C-NMR method). The tacticity determined by the $^{13}$C-NMR method is indicated in terms of proportions of structural units continuously connected to each other, i.e., a diad in which three structural units are connected to each other, and a pentad in which five structural units are connected to each other.

The styrene-based polymers having mainly a syndiotactic configuration of the present invention include polystyrene, poly(alkylstyrene), poly(halogenated styrene), poly(alkoxystyrene), polyvinyl benzoate or mixtures thereof, and copolymers containing them as main components, each having such a syndiotactic configuration that the proportion of a diad is at least 75% and preferably at least 85%, or the proportion of a pentad (racemic pentad) is at least 30% and preferably at least 50%.

The poly(alkylstyrene) includes polymethylstyrene, polyethylstyrene, polyisomropylstyrene, and poly(tert-butylstyrene). The poly(halogenated styrene) includes polychlorostyrene, polybromostyrene, and polyfluorostyrene. The poly(alkoxystyrene) includes polymethoxystyrene, and polyethoxystyrene. Particularly preferred among the above polymers are polystyrene, poly(p-methylstyrene), poly(m-methylstyrene), poly(p-tert-butylstyrene), poly(p-chlorostyrene), poly(m-chlorostyrene), poly(p-fluorostyrene), and a copolymer of styrene and p-methylstyrene.

The styrene-based polymers produced by the process of the present invention usually have a number average molecular weight of 1,000 to 5,000,000 preferably 50,000 to 4,000,000.

The styrene-based polymers produced by the process of the present invention are, as described above, of high syndiotacticity. High purity styrene-based polymers of markedly high syndiotacticity can be obtained, if deashing treatment using a rinsing solution containing hydrochloric acid, etc. is applied after polymerization, and if necessary; after washing and drying under reduced pressure, washing with a solvent, e.g., methyl ethyl ketone is applied to remove a soluble portion; and the insoluble portion is treated with chloroform, etc.

The catalyst of the present invention possesses markedly high activity. Polymerization of styrene-based monomers in the presence of the catalyst of the present invention results in efficiently producing styrene-based polymers having a high syndiotacticity.

These highly syndiotactic styrene-based polymers are excellent in physical properties such as heat resistance and chemical resistance and can be widely used in various applications.

EXAMPLE 1

(1) Preparation of Contact Product of Trimethylaluminum and Water 74 g (0.30 mol) of copper sulfate pentahydrate ($CuSO_4 \cdot 5H_2O$), 500 ml of toluene, and 74 ml (0.78 mol) of trimethylaluminum were placed in a 1,000 ml glass reactor purged with argon gas, and reacted at 20° C. for 36 hours. Then solids were removed from the reaction mixture and further, a volatile component was distilled away under reduced pressure from the above solution to obtain 16.5 g of a contact product. This contact product was dissolved in 50 ml of toluene and used as a catalyst component.

(2) Polymerization of Styrene 2.00 ml of toluene and 6 mmol as aluminum atom of the contact product obtained in (1) above were placed in a 500 ml reactor. After addition of $30 \times 10^{-3}$ mmol of ethylene glycol, $60 \times 10^{-3}$ mmol of pentamethylcyclopentadienyltitanium trimethoxide and 50 ml of styrene were introduced, and polymerization reaction was carried out at 70° C. for one hour. After completion of the reaction, the product was washed with a mixture of hydrochloric acid and methanol to decompose the catalyst components and then dried to obtain 9.77 g of a polymer. The polymer thus obtained was confirmed to be polystyrene having a syndiotacticity in racemic pentad of 96%.

EXAMPLE 2

In the same manner as in Example 1 except that $20 \times 10-2$ mmol of glycerine was used in place of ethylene glycol, 9.26 g of polystyrene having a syndiotacticity of 96% was obtained.

EXAMPLE 3

In the same manner as in Example 1 except that $30 \times 10^{-2}$ mmol of propylene glycol was used in place of ethylene glycol, 9.01 g of polystyrene having a syndiotacticity of 97% was obtained.

EXAMPLE 4

In the same manner as in Example 1 except that $10 \times 10^{-3}$ mmol of 1,4-cyclohexanediol was used in place of ethylene glycol, 10.78 g of polystyrene having a syndiotacticity of 97% was obtained.

EXAMPLE 5

In the same manner as in Example 1 except that $83 \times 10^{-3}$ mmol of ethylene glycol was used, 8.87 g of polystyrene having a syndiotacticity of 96% was obtained.

COMPARATIVE EXAMPLE 1

The procedure of Example 1 was repeated with the exception that $30 \times 10^{-3}$ mmol of methanol was used in place of ethylene glycol. There was obtained only 0.60 g of polystyrene having a syndiotacticity of 95%.

COMPARATIVE EXAMPLE 2

The procedure of Example 1 was repeated with the exception that ethylene glycol was not added. There was obtained only 1.22 g of polystyrene having a syndiotacticity of 94%.

EXAMPLE 6

(1) Preparation of Contact Product of Trimethylaluminum, Water and Polyhydroxy Compound 200 ml of toluene, 23.7 g (95 mmol) of copper sulfate pentahydrate ($CuSO_4.5H_2O$), 0.62 g (10 mmol) of ethylene glycol and 24 ml (250 mmol) of trimethylaluminum were placed in a 500 ml glass reactor purged with argon, and reacted at 40° C. for 24 hours. Then a solid portion was removed and further, a volatile component was distilled away under reduced pressure from the above solution to obtain 6.40 g of a contact product. This contact product was dissolved in 50 ml of toluene and used as a catalyst component.

(2) Polymerization of Styrene 200 ml of heptane and 6 mmol as aluminum atom of the contact product obtained in (1) above were placed in a 500 ml reactor, and further 0.06 mmol of pentamethylcyclopentadienyltitanium trimethyl and 50 ml of styrene were added. Polymerization was carried out at 70° C. for one hour. After completion of the reaction, the reaction product was washed with a mixture of hydrochloric acid and methanol to decompose the catalyst components and then dried to obtain 8.75 g of a polymer. The polymer thus obtained was polystyrene having a syndiotacticity of 98%.

EXAMPLE 7

(1) Preparation of Contact Product of Trimethylaluminum, Water and Polyhydroxy Compound In the same manner as in Example 1 (1) except that 0.46 g (5 mmol) of glycerine was used in place of ethylene glycol, 6.35 g of a contact product was obtained.

(2) Polymerization of Styrene

In the same manner as in Example 1 (2) except that the contact product obtained in (1) above was used, 9.32 g of polystyrene having a syndiotacticity of 98% was obtained.

EXAMPLE 8

(1) Preparation of Trimethylaluminum, Water and Polyhydroxy Compound

In the same manner as in Example 1 (1) except that 0.90 g (10 mmol) of 1,4-butanediol was used in place of ethylene glycol, 5.89 g of a contact product was obtained.

(2) Polymerization of Styrene

In the same manner as in Example 1 (2) except that the contact product obtained in (1) above was used, 8.30 g of molystyrene having a syndiotacticity of 97% was obtained.

EXAMPLE 9

(1) Preparation of Trimethylaluminum, Water and Polyhydroxy Compound

In the same manner as in Example 1 (1) except that 1.16 g (10 mmol) of 1,4-cyclehexanediol was used in place of ethylene glycol, 7.02 g of a contact product was obtained.

(2) Polymerization of Styrene

In the same manner as in Example 1 (2) except that the contact product obtained in (1) above was used, 9.77 g of polystyrene having a syndiotacticity of 98% was obtained.

COMPARATIVE EXAMPLE 3

(1) Preparation of Contact Product of Trimethylaluminum, Water and Polyhydroxy Compound In the same manner as in Example 1 (1) except that 0.32 g (10 mmol) of methanol was used in place of ethylene glycol, 5.23 g of a contact product was obtained.

(2) Polymerization of Styrene

The procedure of Example 1 (2) was repeated with the exception that the contact product obtained in (1) above was used. There was obtained only 0.70 g of polystyrene having a syndiotacticity of 93%.

COMPARATIVE EXAMPLE 4

(1) Preparation of Trimethylaluminum and Water

In the same manner as in Example 1 (1) except that ethylene glycol was not added, 5.77 g of a contact product was obtained.

(2) Polymerization of Styrene

The procedure of Example 1 (2) was repeated with the exception that the contact product obtained in (1) above was used. There was obtained only 1.24 g of polystyrene having a syndiotacticity of 94%.

The type and amount of the polyhydroxy compound, and the yield and syndiotacticity of the polymer obtained in Examples 1 to 9 and Comparative Example 1 to 4 are shown in Table 1.

TABLE 1

| | Polyhydroxy Compound | | Styrene-Based Polymer | |
|---|---|---|---|---|
| No. | Type | Amount Al/OH* | Yield (g) | Syndiotacticity (%) |
| Example 1 | Ethylene glycol | 13 | 9.77 | 96 |
| Example 2 | Glycerine | 13 | 9.26 | 96 |
| Example 3 | Propylene Glycol | 13 | 9.01 | 97 |
| Example 4 | 1,4-Cyclohexanediol | 39 | 10.78 | 97 |
| Example 5 | Ethylene glycol | 3 | 8.87 | 96 |
| Example 6 | Ethylene glycol | 12.5 | 8.75 | 98 |
| Example 7 | Glycerine | 16.7 | 9.32 | 98 |

TABLE 1-continued

| No. | Polyhydroxy Compound Type | Amount Al/OH* | Styrene-Based Polymer Yield (g) | Syndio-tacticity (%) |
| --- | --- | --- | --- | --- |
| Example 8 | 1,4-Butanediol | 12.5 | 8.30 | 97 |
| Example 9 | 1,4-Cyclohexanediol | 12.5 | 9.77 | 98 |
| Comparative Example 1 | Methanol | 26 | 0.60 | 95 |
| Comparative Example 2 | None | — | 1.22 | 94 |
| Comparative Example 3 | Methanol | 25.0 | 0.70 | 93 |
| Comparative Example 4 | None | — | 1.24 | 94 |

*Molar ratio of aluminum atom to hydroxy group.

What is claimed is:

1. A process for producing a styrene-based polymer having a mainly syndiotactic configuration which comprises polymerizing at least one monomer selected from styrene and a styrene derivative at polymerizing temperatures of −10° C. to 100° C. in the presence of a catalyst containing (A) a titanium compound, (B) an alkylaluminoxane and (C) an organic polyhydroxy compound;

wherein (A) is at least one compound represented by the formula:

$$TiR^1_a R^2_b R^3_c R^4_{4-(a+b+c)}$$

or $$TiR^1_d R^2_e R^3_{3-(d+e)}$$

where $R^1$, $R^2$, $R^3$ and $R^4$ are independently a hydrogen atom, a $C_{1-20}$ alkyl group, a $C_{1-20}$ alkoxy group, a $C_{6-20}$ aryl group, a $C_{6-20}$ alkylaryl group, a $C_{6-20}$ arylalkyl group, a $C_{1-20}$ acyloxy group, a cyclopentadienyl group, a substituted cyclopentadienyl group, an indenyl group or a halogen atom, a, b and c are independently an integer of 0 to 4, d and e are independently an integer of 0 to 3; and (C) is at least one member selected from the group consisting of ethylene glycol, propylene glycol, 1,4-butanediol, 1,2-pentanediol, hexanediol, pinacol, glycerine, diethylene glycol, triethylene glycol, dipropylene glycol, 1,4-cyclohexane diol, 1,3-cyclohexane diol, sorbitol, mannitol, hydroquinone, catechol and pyrogallol;

wherein said catalyst is obtained by first mixing component (A) with component (B) and thereafter adding component (C).

2. The process of claim 1, wherein the molar ratio aluminum in component (B) to titanium in component (A) is 1:1 to $1 \times 10^6:1$.

3. The process of claim 2, wherein the molar ratio of aluminum in component (B) to titanium in component (A) is 10:1 to $10^4:1$.

4. The process of claim 1, wherein the molar ratio of component (B) to component (C) is 100:90 to 100:0.01.

5. The process of claim 4, wherein the molar ratio of component (B) to component (C) is 100:50 to 100:1.

6. The process of claim 1, wherein component (A) contains a cyclopentadienyl ring.

* * * * *